United States Patent Office 3,360,629
Patented Dec. 26, 1967

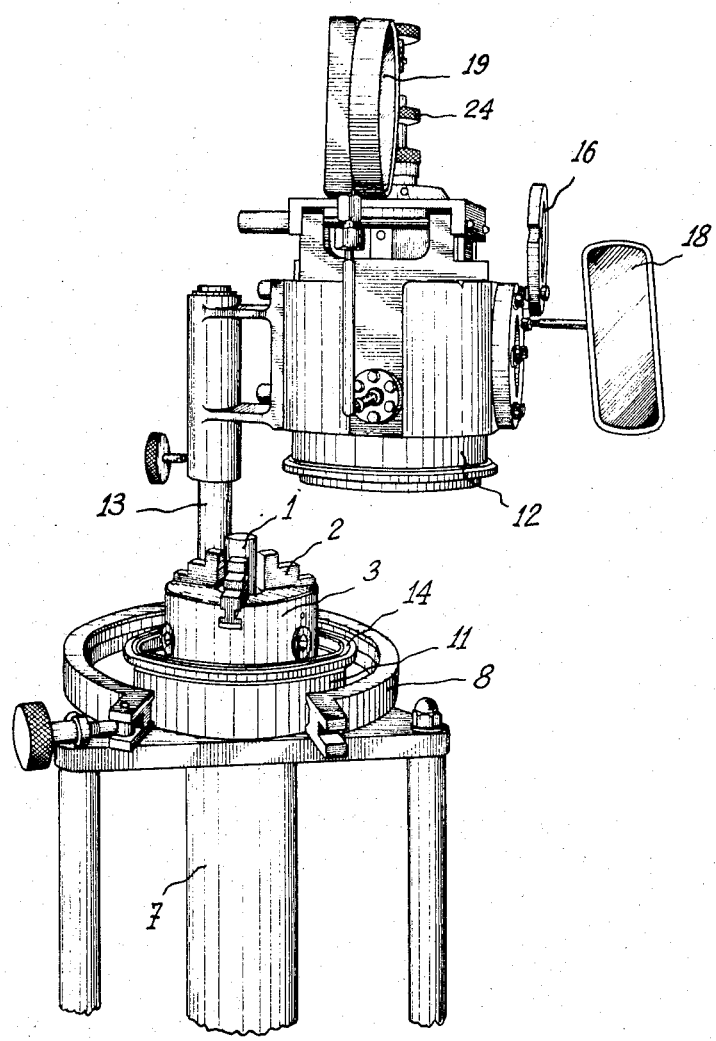

3,360,629
DEVICE FOR ARC WELDING UNDER GAS PRESSURE
Claude Bridoux, Valentigney, Henri Foulquier, Rueil, Jean Kauffmann, Gif-sur-Yvette, and Paul Thome, Saint-Cloud, France, assignors to Commissariat à l'Energie Atomique, Paris, France
Filed Nov. 7, 1962, Ser. No. 236,085
Claims priority, application France, Nov. 13, 1961, 878,751
1 Claim. (Cl. 219—72)

The present invention relates to shielded-arc welding at pressures which are higher than the pressure of the atmosphere.

The invention more especially concerns the enclosed arc-welding of dangerous materials which it is necessary to isolate from the operator, for example radioactive materials.

The purpose of the invention is to permit substantial weld penetrations, to make it possible to weld materials which cannot readily be welded and materials which are, for example, of a porous nature, and in certain cases to produce a given pressure in the interior of a welded enclosure.

The main advantages offered by the invention are as follows:

Concentration of the arc under high pressure, thereby providing a means of substantially increasing weld penetrations as a result of the increase in power density, Substantial reduction, under the action of pressure, of porosities or of blow-holes of certain materials which can thus more readily be welded, The production of a given pressure in the interior of an enclosure by welding at this pressure, this latter possibility being of special interest, for example for the welding of containers, fuel elements, etc.

The present invention consists of a device designed on the principle of a fully-enclosed arc-welding machine constituted by an enclosure which is leakproof at pressures in excess of one atmosphere, and comprising a welding chamber which can be opened and inside of which is fitted a workpiece clamping chuck driven by a motor, there being vertically placed in said chamber an electrode which can be adjusted both vertically and laterally, a shell constructed of standard interchangeable elements which are fastened together in fluid-tight manner and the number of which can vary according to the length of the workpiece to be welded, and means for bringing a gas under pressure into said leakproof enclosure.

The invention can additionally comprise the following features taken separately or in combination:

Means of the counterweight type are provided for the purpose of balancing the weight of the welding chamber which is lifted in order that the workpiece to be welded may be fitted in position inside the chuck, The welding chamber is connected to a pressure-gauge, The welding chamber is provided with an inspection port which is glazed with methyl polymethacrylate, The said inspection port is fitted with a movable protection window of tinted glass, The complete assembly is placed inside a bell-housing which is fitted with gloves and a lock-chamber and which is secured in leakproof manner to the top portion of a block which contains a rotary drive motor and which is fitted with a control panel.

Reference being made to the accompanying FIGURES 1 and 2, there will now be described below one example of a machine for arc-welding under gas-pressure in accordance with the invention.

FIG. 2 is a detail view in perspective of the welding chamber which is assumed to be in the open position.

Figure 1:
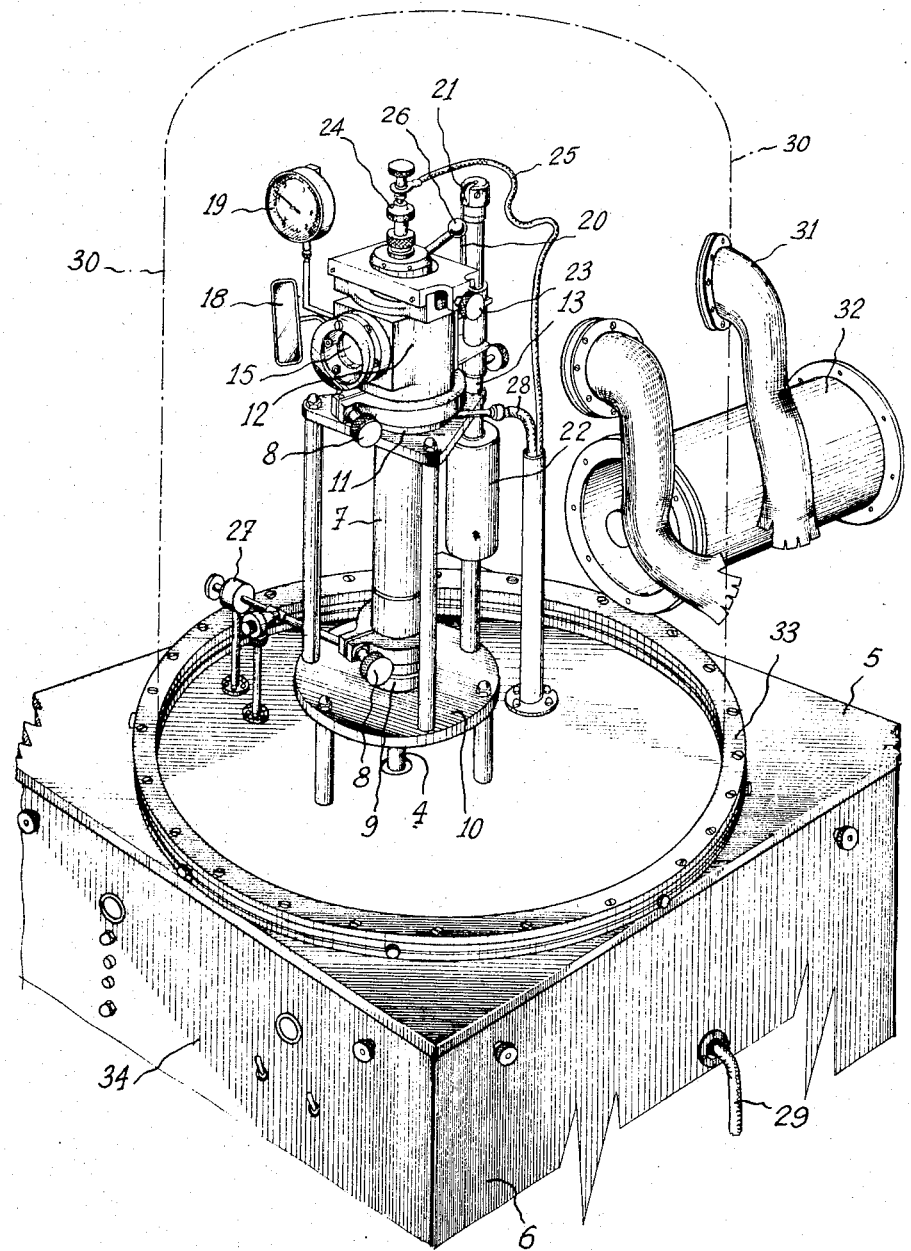
FIG. 1 is a view in isometric perspective of the welding machine as a whole.

As shown in these figures, the workpiece 1 to be welded is gripped between the jaws 2 of the workpiece clamping chuck 3 which is driven in rotation by means of the shaft 4, this latter being in turn driven by a mechanism (not illustrated) which permits of a variable speed, while a vacuum-tight passageway is provided for the said shaft 4 through the horizontal wall 5 of the block 6 which contains the said system.

The workpiece 1 to be welded is placed inside a shell 7. Shell 7 can be formed of a number of tubes assembled together in leakproof manner by means of fastening-clamps such as the clamp 8. The number of tubes for shell 7 depends on the length of the workpiece to be welded and has been assumed in the drawings to be constructed of only a single element. One end of this single element is fixed by means of a fastening-clamp such as the clamp 8 inside a socket 9 formed on the bottom plate 10. The other end of the single element is secured to the bottom portion 11 of the welding chamber 12.

The top portion of the welding chamber 12 which is adapted to pivot about the shaft 13 is accordingly capable either of taking up the open position which is illustrated in FIG. 2 in order that the workpiece to be welded may thus be fitted in the chuck, or of moving downward into the closed position in such manner as to fit on to the bottom portion 11 of said welding chamber and to be tightly clamped thereon by means of a fastening-clamp such as the clamp 8 which compresses the joint 14, the process of welding under gas-pressure being thus permitted to take place in said closed position.

The welding chamber 12 is provided with an inspection port 15 of methyl polymethacrylate over which there can be placed a window 16 of tinted glass which is mounted to pivot about the pin 17 and is intended to protect the eyes of the operator, who is thus able to observe the progress of the welding operation by means of the rear-view mirror 18. The welding chamber 12 is also fitted with a pressure-gauge 19 which serves for the purpose of controlling the pressure.

The top portion of the welding chamber 12 is suspended from a wire 20 which is connected through the intermediary of the pulley 21 to a counterweight 22 which balances the weight of the said chamber during the vertical movements of this latter; the said counterweight 22 slides on the shaft 13 which is split over its entire length so as to provide a passageway for the wire 20 which is connected to the counterweight 22. The position of the electrode can be adjusted laterally by means of the knurled knob 23 and vertically by means of the knurled knob 24, provision being made to lock the said knurled knob 24 by means of the hand lever 26. Electric current is supplied to the electrode through the flexible cable 25.

Two pipes terminate in the unit constituted by the welding chamber 12 and the shell 7: one pipe 27 which is connected to a primary pumping circuit fitted with filters terminates at the bottom portion of the shell 7, while the other pipe 28 which is connected to the pipe 29 for the supply of metered gas under pressure (helium, argon, etc.), terminates at the bottom portion 11 of the welding chamber.

The complete assembly is placed inside a bell-housing 30 of methyl polymethacrylate which is fitted with gloves such as those designated by the reference 31 and a lock-chamber 32. The said bell-housing 30 is secured in leak-proof manner by the annular flange 33 to the top face 5 of the block 6, while one of the lateral faces of said block constitutes the control panel 34.

Welding tests have been carried out in the welding machine as heretofore described on sintered aluminium at absolute pressures from 0 to 16 kgs./cm.² and it has accordingly been found:

(1) That when the pressure increases, the arc concentration increases in the same proportion, thereby making it possible to increase the weld penetrations to an appreciable extent, (2) That if the weld is not impervious when effected at a pressure of 1 kg./cm.², imperviousness is achieved in the case of welds effected at pressures of 8 kgs./cm.² or 10 kgs./cm.².

It will be understood that the invention is not in any sense limited to the various arrangements which have been referred-to above, but is intended on the contrary to include within its scope all alternative forms thereof.

What we claim is:

Arc-welding machine for welding at pressures several atmospheres in excess of atmospheric pressure comprising a leakproof welding chamber, means for opening said chamber, a workpiece clamping chuck mounted in said chamber, mechanism for driving said chuck, an electrode in said chamber, means for adjusting said electrode vertically and laterally with respect to the workpiece, a shell beneath said chuck receiving the workpiece, a plurality of interchangeable leakproof elements forming said shell depending on the length of the workpiece, means for supplying a gas under pressure to said chamber, a counterweight connected to and balancing the weight of said chamber, a bell-housing enclosing the machine, gloves for said bell-housing, a lock-chamber for said bell-housing, a block supporting the machine and said bell-housing, said mechanism being located in said block and a control panel on said block for said mechanism.

References Cited

UNITED STATES PATENTS

| | | | |
|---|---|---|---|
| 419,032 | 1/1890 | Coffin | 219—72 X |
| 2,853,408 | 9/1958 | Stengel | 219—72 X |
| 2,897,539 | 8/1959 | McMillan | 219—72 X |
| 2,985,129 | 5/1961 | Kirkpatrick | 219—72 X |
| 3,020,389 | 2/1962 | Gorman | 219—72 |

FOREIGN PATENTS

| | | |
|---|---|---|
| 117,501 | 2/1958 | Russia. |
| 217,140 | 9/1961 | Austria. |

OTHER REFERENCES

"Welding Engineer," December 1957, p. 84.
"Handbook of Chemistry," N. A. Lang, 6th ed. revised, pp. 714–15.

RICHARD M. WOOD, *Primary Examiner.*

R. F. STAUBLY, *Assistant Examiner.*